United States Patent Office 3,736,161
Patented May 29, 1973

3,736,161
PRODUCTION METHODS FOR DOLOMITE-MAGNESITE REFRACTORY MATERIAL
Ronald Staut and Joseph L. Stein, Cherry Hill, N.J., assignors to General Refractories Company, Philadelphia, Pa.
No Drawing. Filed Mar. 29, 1971, Ser. No. 129,205
Int. Cl. C04b 35/04
U.S. Cl. 106—58          9 Claims

ABSTRACT OF THE DISCLOSURE

A light burned, low flux dolomite is partially hydrated and a magnesium-containing compound that decomposes to form MgO, or light-burned magnesium oxide, is admixed with the partially hydrated dolomite to produce a composition that contains 45–98% by weight magnesium oxide after firing. Subsequently, the partially hydrated admixture is fired to produce a dense refractory grain possessing improved hydration resistance. Preferred results occur when the composition contains over 50% by volume of magnesium oxide after firing, because at these MgO levels, the fired grain tends to exhibit a continuous magnesium oxide matrix.

---

This invention relates to a process for making dense dolomite-magnesite refracory materials and to the products produced by such processes. More particularly, the invention relates to basic refractory materials containing MgO and CaO which exhibit significantly improved refractoriness and hydration stability, and to a method for their manufacture.

Burned dolomite is an attractive steel making refractory material because of the high melting point of the CaO-MgO mixture. The eutectic temperature for this system is 2400° C. Accordingly, dead burned or sintered dolomitic refractories prepared by high temperature calcination and sintering of dolomitic ores are used extensively in the steel industry for the repair of the hearth linings of basic electric and open-hearth furnaces.

In addition, such refractories often comprise the working linings of converters in the oxygen conversion process for the production of steel. Dolomitic refractories are also widely utilized in the lining of rotary kilns for the rock products industry.

Despite the high melting point of the CaO-MgO mixture present in dolomitic refractories, their use has been limited by the tendency of the oxides, especially lime, to revert to the hydroxide or carbonate form upon exposure to moisture or carbon dioxide in the atmosphere. A further problem has been the relatively low resistance of such refractories to high iron slags.

Various attempts have been made to improve the hydration resistance of dolomitic refractories. The use of certain additives such as clay, silica, iron oxide and other fluxing agents have been proposed to improve their hydration resistance. However, the presence of such fluxing agents also has a deleterious effect on the refractoriness and particularly the density of the resulting product. Consequently, flux-containing dolomitic refractories are often inadequate to meet the demands of present day steel making processes especially the oxygen conversion process which uses relatively higher temperatures to obtain greater melting and refining rates.

Another technique heretofore used for the preparation of dolomotic refractories has involved admixing dolomite with pieces of coke and sintering the mixtures in shaft kilns. The combustion of the coke furnishes the heat necessary for sintering. Unfortunately, the residual ash from the coke adds to the impurities in the final dead-burned product. Consequently, as in the addition of fluxing agents, the products produced by this process possess a lowered refractoriness.

Accordingly, the search has been continued to find processes which produce dolomitic refractories without the necessity of incorporating impurities of any kind. Thus, it has been proposed to calcine dolomite to produce dolomitic quicklime, an intimate admixture of calcium oxide and magnesium oxide. Thereafter, the quicklime is hydrated under pressure until the calcium and magnesium contents are fully hydrated. The fully hydrated quicklime is formed into a suitable refractory shape and sintered or dead-burned until the desired refractory article is obtained.

This process makes it possible to prepare dolomitic refractories without the addition of fluxing agents. However, the dolomite must be fully hydrated and such hydration requires the use of pressure. As a consequence, this process requires the use of special equipment and procedures, such as autoclaving, which are expensive and time consuming, and render the economics of the process unfavorable. Further, the dead-burned dolomitic refractories obtained after fully hydrating the quicklime generally lack sufficient density and hydration stability to be used effectively.

It has also been proposed to add lime or a low purity dolomite to magnesium hydroxide and then burn this mixture to produce a synthetic clinker. Generally, it has been difficult to produce refractory materials having a desirable low porosity from synthetic clinker produced by this method. Further, unless high burning temperatures are provided for bricks formed of such clinker, the hot modulus of rupture would tend to be undesirably low.

One approach to stabilization of dolomitic refractories which has proved beneficial is to produce a dense, high-purity dolomite grain having a low surface area. This low surface area makes the kinetics of the reaction converting CaO to the hydroxide or carbonate form much less favorable. Such a process is described in application Ser. No. 28,040, filed Apr. 13, 1970, now U.S. Pat. 3,698,922, by the assignee of this application. The method there disclosed is very desirable because no fluxing ingredients are added, and the refractory material retains excellent high temperature characteristics. This process yields a product which is still subject to hydration, but the high density of the product increases its useful shelf life by decreasing the available surface area which can be attacked by humidity.

The process of the present invention produces a dolomitic refractory composition which further improves the hydration and slag resistance characteristics of the dense, low-flux dolomite described in application Ser. No. 28,040.

The present invention thus provides a method of producing a dense hydration-resistant refractory material in which a low-flux, light burned dolomite ore is partially hydrated, and then admixed with a magnesium compound that decomposes to the oxide form when heated, or light burned MgO, to yield a composition that, when fired, contains 45–98% MgO. Preferably, sufficient magnesium is added to provide a fired grain comprising 65–75% by weight MgO.

The invention also provides as a new product, the dense dolomitic refractory grain possessing excellent hydration and slag corrosion resistance properties that is produced by the process of the invention.

The invention provides a refractory material which possess the advantages of an all-magnesia refractory that is, good hydration resistance and good resistance to high iron slag. Refractory materials produced in accordance with the invention also possess the desirable properties of a low flux dolomite refractory, namely, good strength at high temperatures and good slag spalling resistance.

The cost of the new dolomite-magnesite grain is intermediate between that of the more expensive high purity magnesite grain and that of low flux dolomite grain.

The invention resides in the novel processes, products, compositions and improvements shown and described. Both the foregoing general description and the following detailed description are exemplary and explanatory, and should not be considered to restrict the scope of the invention.

Dolomitic refractories can be produced according to the present invention from most light burned, domestic, commercially available, low-flux dolomite rock compositions, that is, compositions containing at least about 97% by weight of Ca and Mg on an oxide basis. It is preferable, however, to employ a high purity dolomite rock, i.e. one comprising at least 99 percent CaO and MgO. Such high purity dolomite rock provides products having greater refractoriness than rock containing a higher percentage of impurities. The Niagran type of dolomite rock found in northwestern Ohio is a particularly good dolomite starting material for use in the present invention.

The dolomite ore utilized in the process of the invention is in a light burned condition. Light burning is accomplished by calcination of the dolomite at temperatures in the range of about 1000° C. to 1400° C. The time required for light burning will vary with the temperature used, and will ordinarily be in the range of about one-half to two hours. Light burning destroys the carbonate structure of the dolomite, but does not cause the dolomite to agglomerate into large clumps.

Any suitable kiln, typically, a shaft or rotary kiln, can be utilized for light burning the dolomite. The fuel used in the kiln should be one that does not introduce excessive amounts of impurities into the calcined product. With rotary kilns, coals of moderate or low ash content, and gas or fuel oil are most effectively utilized. One type of shaft kiln, known as an Arnold kiln, is heated by means of coal-fired Dutch ovens opening into the lower part of the kiln. On the other hand, Azbe type shaft kilns are preferably fired with producer or natural gas.

The size of the dolomite stone to be calcined is selected on the basis of the particular kiln being utilized, with the most efficient and economical use of the kiln being the prime criteria, rather than any special process techniques.

As is well known, calcination of the raw dolomite stone produces a mixture of oxides, predominantly CaO and MgO and popularly termed quicklime. In accordance with the invention, the quicklime is slaked with water until it is partially hydrated. As used in the specification and claims, the term "partially hydrated" means that the quicklime has been converted to a mixture comprising calcium hydroxide, magnesium hydroxide and magnesium oxide.

Specifically, partially hydrated quicklime in accordance with this invention comprises from about 3 to 40 percent, and preferably from 5 to about 20 percent by weight magnesium oxide (on an oxide basis). The balance of the partially hydrated quicklime is a combination of calcium hydroxide and magnesium hydroxide.

The quicklime is partially hydrated by slaking the calcined dolomite in water at atmospheric pressure. At least 80 parts by weight of water added for each 100 parts by weight of dolomite in this slaking step. Preferably, from 100 to 150 parts of water are added per 100 parts of dolomite.

The partial hydration of the quicklime in accordance with this invention is ordinarily completed in about ¼ to 72 hours, depending on the particle size of the mixed oxides, and can be accomplished, for example, by placing the calcined dolomite and water in a pug mill. Preferably, the desired degree of hydration is achieved in about ½ to 10 hours. Achievement of the desired level of hydration can be determined by routine chemical analysis.

In accordance with the invention, a magnesium compound that will decompose to form MgO, or light burned MgO, is admixed with the partially hydrated mixed oxides to increase the magnesium content of the admixture to at least 45% by weight. Preferably, sufficient of the magnesium containing material is added to provide a continuous MgO phase upon firing the admixture. While improved hydration resistance and slag spalling resistance are provided by adding sufficient magnesium providing material to raise the MgO content of the composition to slightly less than 50% by volume, there is a significant improvement in the properties when the MgO phase is continuous. The desired continuous MgO phase is always produced when the fired composition contains from 65% to 75% MgO which is presently considered to be the optimum composition.

The magnesium-providing material should be MgO or a decomposable magnesium salt that readily decomposes to the oxide form when heated in the presence of air or oxygen. Typical readily decomposable salts include $MgCO_3$, $Mg(OH)_2$, and $Mg(NO_3)_2$, magnesium acetate, and magnesium hydrocarbonate.

The magnesium-containing material is preferably added to the partially hydrated mixed oxides in a pug mill, screw conveyor or other mixing apparatus. Desirably, after admixing the magnesium source material and the partially hydrated oxides in such a mill, the average particle size of the mixture does not exceed about 10 microns. The hydration of the light burned dolomite can be achieved after addition of the magnesium-containing material.

If MgO or another source of magnesium, other than $Mg(OH)_2$ is added to the partially hydrated oxides, it may be desirable to add more water to partially hydrate some of the MgO to facilitate processing by keeping the material at a plastic consistency.

After the addition of the magnesium-containing compound, as set forth above, the resulting admixture is formed into a refractory shape suitable for sintering (dead burning) and is usually subsequently dried. In some cases a separate drying step is omitted and the small amount of drying necessary to provide abrasion resistance during firing is accomplished during the heating stage of the firing step.

The admixture may be nodulized, extruded, or pressed into pellets or briquettes. The forming step generally involves a compaction or pressing operation utilizing conventional equipment capable of supplying sufficient pressure to give a coherent, dense refractory shape. Either hydraulically or mechanically actuated presses can be used. Pressures in the range of about 4,500 to 10,000 p.s.i. have been found to be satisfactory, although higher pressures ranging up to approximately 30,000 p.s.i. can be utilized. In some instances, the higher pressures are preferable in order to obtain stronger refractory shapes possessing better resistance to abrasion during handling.

It is possible to combine the drying and shaping steps of the present process by extruding or nodulizing on a chain dryer.

The formed refractory shapes can be stored or immediately burned or sintered. It has been found that the refractory shapes tend to harden because of the formation of a carbonate skin and become more abrasion resistant if they are permitted to dry for approximately 24 hours after forming and before sintering.

To achieve the desired refractory properties, the dolomitic material of this invention, containing added magnesium, is sintered or dead-burned. Sintering or dead-burning of the formed refractory is accomplished in any suitable rotary or shaft kiln which is capable of supplying the desired high temperatures. The fuel utilized for firing the kiln may be natural gas, fuel oil, powdered coal or any other acceptable fuel. The use of natural gas or fuel oil is preferred since these fuels, unlike coal, do not introduce additional impurities into the product.

The dead-burning or sintering time varies, of course, with the temperature utilized. As might be expected, less sintering time is necessary at higher temperatures. For example, it has been found that exposure of a refractory shape for approximately 20 to 25 minutes at about 1700° C. produces a sintered dolomitic refractory possessing relatively high density. Generally, the sintering temperature will be in the range of about 1300° C. to 1800° C. and preferably 1500° C. to 1700° C. The process of this invention permits the production of dense high magnesia refractory grain at a significantly lower final burn temperature than can conventionally be utilized.

After sintering, the refractory product can be directly used or it can be pressed with pitch into brick shapes and tempered by conventional means. Most often, the dolomitic refractory grains are coated with pitch before they are pressed into a final shape. Of course, the sintered refractory product can also be pressed into a suitable brick shape and then fired conventionally.

The most desirable microstructure for the refractory grain produced by the present process comprises a continuous MgO matrix containing isolated pockets of CaO. This microstructure differs markedly from the microstructure of most high purity (<1% impurities) natural dolomitic refractory grain, which usually contains about 40% MgO and 60% CaO and exhibits a continuous CaO matrix containing isolated pockets of MgO.

The density of the material produced in accordance with the present invention is very high, above about 3.3 g./cc. after sintering. The porosity of the material is very low.

For a better understanding of the invention, the following examples are provided. These examples are intended to be illustrative, and should not be construed as limiting the invention. All parts and percentages listed in the specification and claims are by weight unless otherwise noted.

EXAMPLES 1–3

A low-flux dolomite (<1% impurities) is calcined at 1200° C. for about 2 hours in an electric furnace. This dolomite contains 40% MgO and 60% CaO by weight.

Four separate samples of the calcined dolomite are partially hydrated by adding about 150 parts of water per 100 parts of calcined dolomite and blending in air in a pug mill for about 2 hours.

Sufficient $Mg(OH)_2$ is then added to three of these samples to produce compositions that when fired comprise: Example 1—MgO 48.8%, CaO 51.2%; Example 2—MgO 68.4%, CaO 31.4%; and Example 3—MgO 74.4%, CaO 25.6%. No MgO is added to the fourth sample which serves as a control.

Subsequently, each of the four samples is formed into pellets and fired at 1600° C. for about 2 hours.

Water etching of the refractory materials produced by the technique described above reveals that the microstructures of the material of Example 1 and the control material contain a continuous CaO matrix, while the refractory materials of Examples 2 and 3 each have a continuous MgO matrix.

The four refractory materials produced as described above are tested for hydration resistance. A sample of each refractory material is placed on an elevated rack in a closed vessel having its bottom surface covered with water. The vessel is held at 72° F. and water vapor saturates the atmosphere within the vessel. The control, a low-flux refractory containing no added MgO, and the material of Example 1 perished after 30 days in this environment with the control exhibiting a faster rate of hydration. The dolomite-magnesite grain of Example 2, with a continuous MgO matrix (68.4% MgO, 31.6% CaO) exhibited cracking only after 78 days in the vessel. The refractory grain of Example 3 (74.4% MgO, 25.6% CaO) exhibited only slight surface dusting after 80 days in the vessel. These results dramatically illustrate the improved hydration resistance provided by the refractory materials of this invention.

The materials of Examples 1–3 also provide better slag resistance than low-flux natural dolomite refractories, and possess higher strength properties and better resistance to slag spalling when compared to pure MgO refractories.

The foregoing detailed description has been provided for clearness of understanding only, and no unnecessary limitations should be implied therefrom. Some modifications of the process and composition described will be obvious to those skilled in the art.

What is claimed is:
1. A process of producing a dense, hydration-resistant refractory grain comprising:
   (a) partially hydrating a light burned dolomite;
   (b) admixing a magnesium-containing compound that decomposes to form MgO, or light burned MgO with the partially hydrated dolomite to yield a composition that, when fired, contains 45–98% MgO; and
   (c) firing the admixed magnesium-containing compound and partially hydrated dolomite.

2. The process of claim 1 in which the admixture is nodulized on a chain dryer before firing.

3. The process of claim 1 in which the amount of magnesium-containing compound admixed with the mixture of oxides is sufficient to yield a refractory composition that contains from 65% to 75% MgO after firing.

4. The process of claim 1 in which the magnesium-containing compound is $Mg(OH)_2$.

5. The process of claim 1 in which sufficient light burned MgO is added to the light burned dolomite to produce a grain containing a continuous MgO matrix.

6. The method of claim 1 in which the partially hydrated admixture, is shaped by pressing, dried and then fired at a temperature of from 1500° C.–1700° C.

7. The process of claim 6 in which sufficient magnesium-containing compound or MgO is added to yield a refractory grain that exhibits a continuous MgO matrix.

8. The process of claim 1 in which the light burned dolomite is partially hydrated by mixing with over 80 parts of water per 100 parts of oxide.

9. The process of claim 8 in which the light burned dolomite is partially hydrated by mixing with from 100–150 parts of water.

References Cited

UNITED STATES PATENTS

| | | | |
|---|---|---|---|
| 3,304,188 | 2/1967 | Hughey | 106—61 |
| 3,060,042 | 10/1962 | Leatham et al. | 106—63 |
| 3,231,402 | 1/1966 | Leatham | 106—63 |
| 3,026,211 | 3/1962 | Cutler | 106—63 |
| 3,351,476 | 11/1967 | Weaver et al. | 106—63 |
| 3,370,968 | 2/1968 | Weaver | 106—63 |

JAMES E. POER, Primary Examiner

U.S. Cl. X.R.

106—61, 63